United States Patent
Lyons

(10) Patent No.: US 7,415,825 B2
(45) Date of Patent: Aug. 26, 2008

(54) VARIABLE GEOMETRY TURBOCHARGER CONTROL METHOD AND APPARATUS

(75) Inventor: Timothy M. Lyons, Batavia, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/451,893

(22) Filed: Jun. 13, 2006

(65) Prior Publication Data

US 2007/0283696 A1  Dec. 13, 2007

(51) Int. Cl.
F02D 23/00 (2006.01)
(52) U.S. Cl. ........................... 60/602; 60/605.2
(58) Field of Classification Search ............ 60/605.2, 60/602; 123/559.1, 563, 564
See application file for complete search history.

(56) References Cited

U.S. PATENT DOCUMENTS

| 6,233,934 | B1 * | 5/2001 | Church et al. ............ 60/602 |
| 6,247,311 | B1 * | 6/2001 | Itoyama et al. ............ 60/602 |
| 6,263,672 | B1 * | 7/2001 | Roby et al. ............ 60/605.2 |
| 6,418,719 | B2 | 7/2002 | Terry et al. |
| 6,427,445 | B1 | 8/2002 | Isaac et al. |
| 6,434,476 | B1 * | 8/2002 | Zagone ............ 701/115 |
| 6,553,949 | B1 * | 4/2003 | Kolmanovsky et al. ... 123/48 B |

* cited by examiner

*Primary Examiner*—Hoang M Nguyen
(74) *Attorney, Agent, or Firm*—Jeffrey P. Calfa; Jack D. Nimz

(57) ABSTRACT

A method of controlling a variable geometry turbocharger (502) includes the steps of determining an engine start of operation (402), initiating a timer (408), and commanding an open position (412) for the vanes of the variable geometry turbocharger (502). The open position (412) may be maintained for a predetermined time (t'), after which, normal operation may resume (406).

9 Claims, 4 Drawing Sheets

US 7,415,825 B2

VARIABLE GEOMETRY TURBOCHARGER CONTROL METHOD AND APPARATUS

FIELD OF THE INVENTION

This invention relates to internal combustion engines, including but not limited to control schemes for variable geometry turbochargers.

BACKGROUND OF THE INVENTION

Some internal combustion engines use turbochargers and other devices to improve their performance. A typical turbocharger includes a turbine, which is driven by exhaust gas, connected to a center housing, which in turn is connected to a compressor by a shaft running through the turbocharger that rotates during operation of the turbocharger and requires lubrication.

Lubrication for the turbocharger shaft is typically accomplished in the center housing by a flow of oil from the engine passing therethrough. The flow of oil usually is supplied by an oil pump attached to the engine. A series of tubes and passages usually fluidly connects an outlet of the oil pump with an inlet in the center housing. Oil drains from the center housing back into the engine.

When the engine is not operating, the oil pump does not supply oil to the center housing of the turbocharger, and most if not all of the oil in the center housing drains into the engine. When the engine is first turned on, the turbocharger shaft begins to rotate through the action of exhaust gas coming from the engine. As the engine begins to operate, the oil pump also begins to pump oil to various engine components, including the turbocharger. There is a lag time for oil from the oil pump before it reaches and lubricates the rotating shaft in the center housing of the turbocharger. This time lag may be attributed, in part, to factors such as the time required to prime the oil pump, travel time through the various tubes and passages connecting the oil pump and the center housing for the initial flow of oil, or high oil viscosity due to cold engine operation. During this lag time, the shaft in the center housing may be rotating without lubrication. This operation of the shaft without lubrication may cause scuffing or other damage of bearings attached thereon, a condition that may be exacerbated by high shaft rates of rotation. Many turbocharger manufacturers may specify a time frame within which a minimum oil pressure must be supplied to the turbo that may depend on the shaft's rotational speed.

Accordingly, there is a need for an apparatus and method for ensuring that adequate lubrication is available for a turbocharger shaft under conditions of initial engine startup or cold engine operation that ensures that adequate lubrication to the turbocharger is available when the engine is in operation.

SUMMARY OF THE INVENTION

A method of controlling a variable geometry turbocharger includes the steps of determining an engine start of operation, initiating a timer, and commanding an open position for the variable geometry turbocharger, wherein little exhaust gas energy is used to drive the turbine. The open position may be maintained for a predetermined time, after which, normal turbocharger vane control operation may resume. Thus, the turbocharger's shaft speed and wear may be reduced until a sufficient flow of lubrication oil has reached the turbocharger after the engine has started.

A method of operating an internal combustion engine may be accomplished by use of at least two modes of operation. When the engine is operating in a first mode, at least one engine parameter may be sensed and inputted into a controller. A control setpoint may be determined based on the at least one engine parameter and compared to a measured value to yield a difference between the control setpoint and the measured value. A duty cycle may be calculated based upon the difference and turbocharger vanes may be actuated based upon the duty cycle. When the engine is operating in a second mode, the turbocharger vanes may be actuated thereby causing them to open and stay open for a predetermined time. The engine may operate in the second mode immediately following an engine startup event, and revert to the first mode of operation when the predetermined time of the second mode has expired.

DESCRIPTION OF A PREFERRED EMBODIMENT

The following describes an apparatus for and method of controlling a variable geometry turbocharger under conditions of cold engine startup. One known control scheme for controlling a variable geometry turbine can be seen in U.S. Pat. No. 6,418,719 by Terry et al. (hereafter the '719 patent), issued on Jul. 16, 2002, the contents of which are incorporated herein in their entirety by reference.

Figure 1:
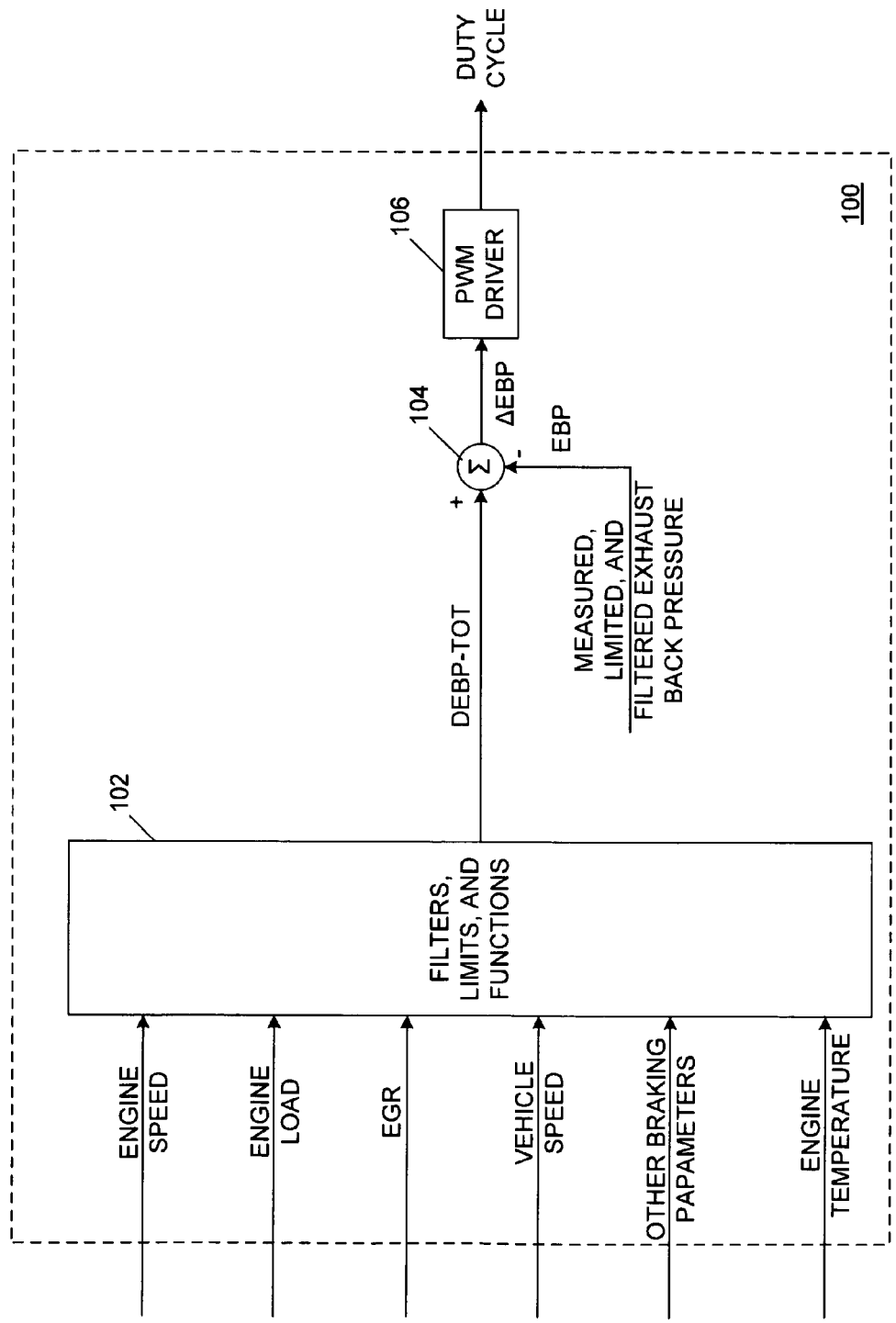
FIG. 1 is a block diagram of a prior art control scheme for a variable geometry turbocharger.

A block diagram of the control scheme of the '719 patent is shown in summary form in FIG. 1. This or a similar control scheme may be considered as a normal control scheme for a turbocharger on an engine, and may be used during a majority of the engine's operation to control the turbocharger. A controller 100 may include a control strategy 102 encoded therein that may perform various functions that include filtering, limiting, and calculating various engine parameters based on various inputs from sensors of the engine or other control strategies in the controller 100. For more details about the functions included in the control strategy 102 reference may be made to the '719 patent. The strategy 102 may calculate a desired back pressure DEBP-TOT based on various inputs that include engine speed, engine load, exhaust gas recirculation amounts commanded (EGR), vehicle speed, engine temperature, and/or other engine or braking parameters.

The desired back pressure DEBP-TOT may be a total desired back pressure, and may be compared to an actual back pressure EBP signal that may have been filtered and limited. The comparison may be a difference calculation 104 of the desired backpressure DEBP-TOT minus the actual backpressure EBP to yield a backpressure difference $\Delta$EBP. The output backpressure difference $\Delta$EBP from the calculation 104 may be sent to a pulse width modulation (PWM) driver 106, or another device, that converts a the backpressure difference ΔEBP to a current signal that is sent to an actuator arranged to change a position of vanes on a turbocharger.

The '719 patent uses exhaust back pressure to control the variable geometry turbocharger, and is used for illustration of one example of a control scheme for the variable geometry turbocharger. Other known control schemes may include control of a turbocharger based on engine intake air pressure (boost), a pressure difference between exhaust gas and intake air pressures on the engine (ΔP), and so forth. The improvements described in the embodiments below may advantageously be applicable to any turbocharger control scheme with equal effectiveness.

Figure 2:
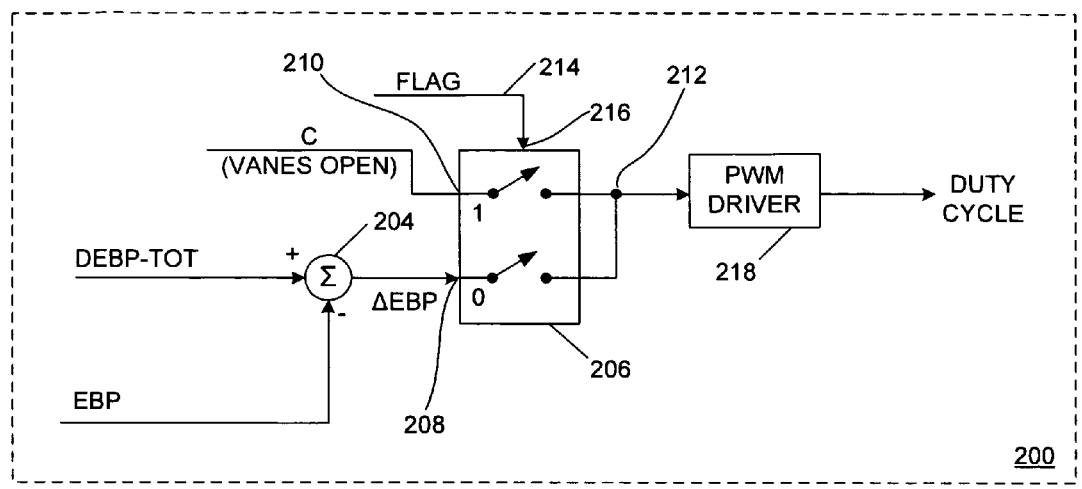
FIG. 2 is a block diagram of a control scheme for a variable geometry turbocharger in accordance with the invention.

A block diagram of an improvement upon the control scheme described in the '719 patent is shown in FIG. 2. A controller 200 may include control algorithms coded therein that yield a desired backpressure value DEBP-TOT as described above. The desired back pressure DEBP-TOT may be compared to an actual back pressure EBP signal that may have been filtered and limited. The comparison may be a difference calculation 204 of the desired backpressure DEBP-TOT minus the actual backpressure EBP to yield a backpressure difference ΔEBP.

The value for the backpressure difference ΔEBP may be input to a switch 206. The switch 206 may be a coded algorithm that is constructed to be capable of relaying a value from a first input node 208, or a second input node 210, to an output node 212, based on a value 214, or a binary FLAG, that is present at a control node 216. Switches like the switch 206 may have many other equivalent configurations, including configurations with more than two input nodes having non-binary flag values.

When the FLAG is set to zero (0) at the control node 216, a "connection" may be created within the switch 206 that relays a value present at the first input node 208 to the output node 212. Similarly, when the FLAG is set to one (1) at the control node 216, a value present at the second input node 210 may be relayed to the output node 212. The value present at the second input node 210 may be a calibrateable constant, C, representing a value that, once having passed through a PWM driver 218, is adequate to cause a DUTY CYCLE that will substantially open a position of the vanes in a variable geometry turbocharger. Any value reaching the output node 212 may advantageously be passed to the PWM driver 218 for conversion to the current DUTY CYCLE, which may be used to change the geometry of the turbocharger, as described above.

Figure 3:
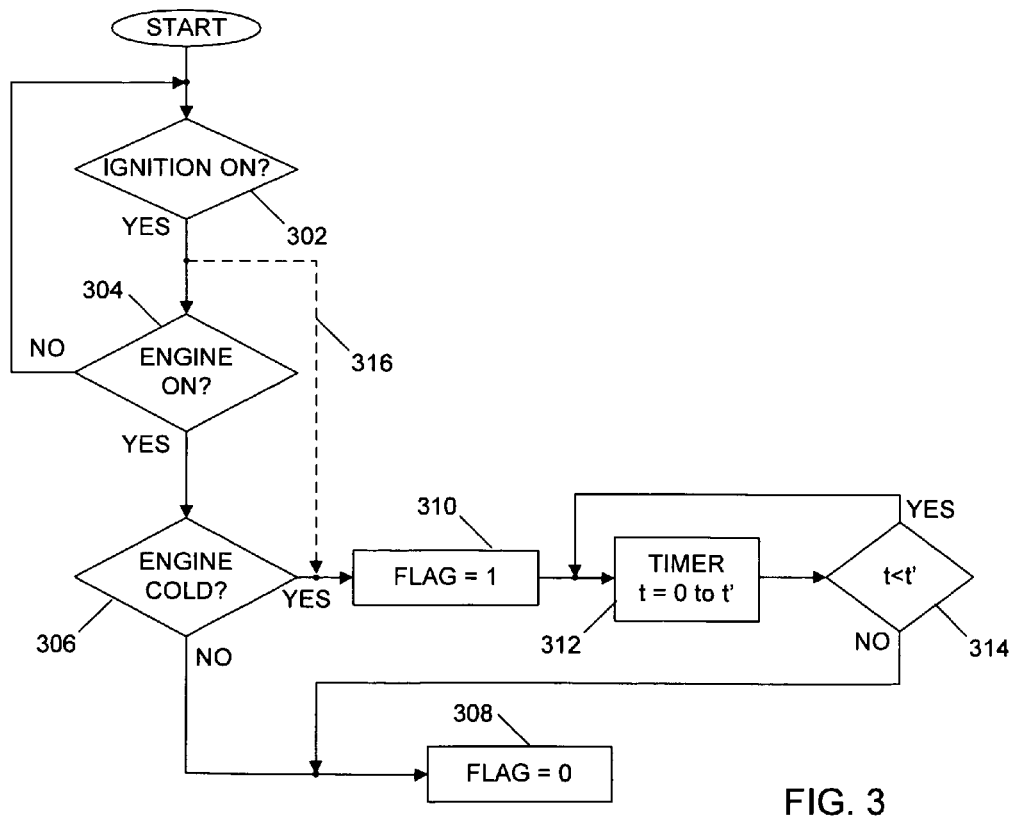
FIG. 3 is a flowchart for a method for determining a duty cycle value for use with the control scheme shown in FIG. 2 in accordance with the invention.

A flowchart for a method for determining a FLAG value for use with the control scheme shown in FIG. 2 is shown in FIG. 3. The flowchart shown in FIG. 3 may advantageously be coded into an electronic engine controller that includes other control algorithms in addition to the functionality shown in FIGS. 1 and 2.

A decision may be made on the operational status of an engine starting with a determination at step 302 of whether an ignition system on the engine is active, if it is determined that the ignition has been turned on, for example, through monitoring of an ignition switch in a vehicle, a determination is made at step 304 of whether the engine is running. The determination at step 304 may be accomplished, for example, by monitoring various sensors on the engine, such as crankshaft or camshaft position sensors, for a determination of whether the engine has reached an idle speed or whether the engine is still in a cranking or standby mode. The determinations at steps 302 and 304 of the operating mode of the engine may aid in vehicle ballery power conservation as described below, but are not necessary.

An affirmative output at step 304, indicating that the engine ignition is ON and the engine is operating normally, leads to a decision at step 306 of a temperature condition of the engine. A determination of whether the engine is cold at step 306 may be accomplished through a variety of methods, for instance, a comparison of temperature of coolant and/or oil of the engine to a predetermined threshold value, a measurement of intake air or exhaust gas temperature at the engine, a time since the engine was previously shut off, and so forth.

When it is determined that the engine is not cold at step 306, a value for the FLAG parameter may be set to zero (0) at step 308 and, as described earlier, a turbocharger on the engine may be controlled in a normal fashion. When it is determined that the engine is cold at step 306, then the FLAG parameter may be set to one (1) at step 310 causing the vanes in the turbocharger on the engine to open. After the FLAG is set to one (1) at step 310, a timer may be initiated at step 312. The timer at step 312 may be an incremental timer that may upwardly increase a time variable t from a value, for example zero (0), to a predetermined time limit, t'. At each increment of the timer at step 312, a decision may monitor a progress of the time variable t at step 314 for a determination whether the predetermined time limit t' has been exceeded. While t is less than t', t may be incremented. When t ceases to be less than t', signifying that a predetermined time limit has been reached, the FLAG may be set back to zero (0) at step 308. Alternatively, a determination at step 302 that an ignition system on the engine is active may directly set the FLAG variable to one (1) at step 310, as denoted by the dotted line path 316. In this alternative situation, the vanes in the turbocharger may be kept open upon activation of the ignition system of the engine before the engine is operating, as well as potentially through engine cranking and engine start of operation.

The time limit t' may advantageously be sufficiently long to ensure that the vanes in the turbocharger on the engine are open enough to keep a turbine shaft speed low enough until lubrication oil may reach the bearings attached thereon and avoid any damage due to operation under conditions of inadequate lubrication. When the time limit t' has been reached, the engine may or may not have been warmed up, but there should advantageously have been enough time for lubrication oil to reach the center housing of the turbine.

Figure 4:
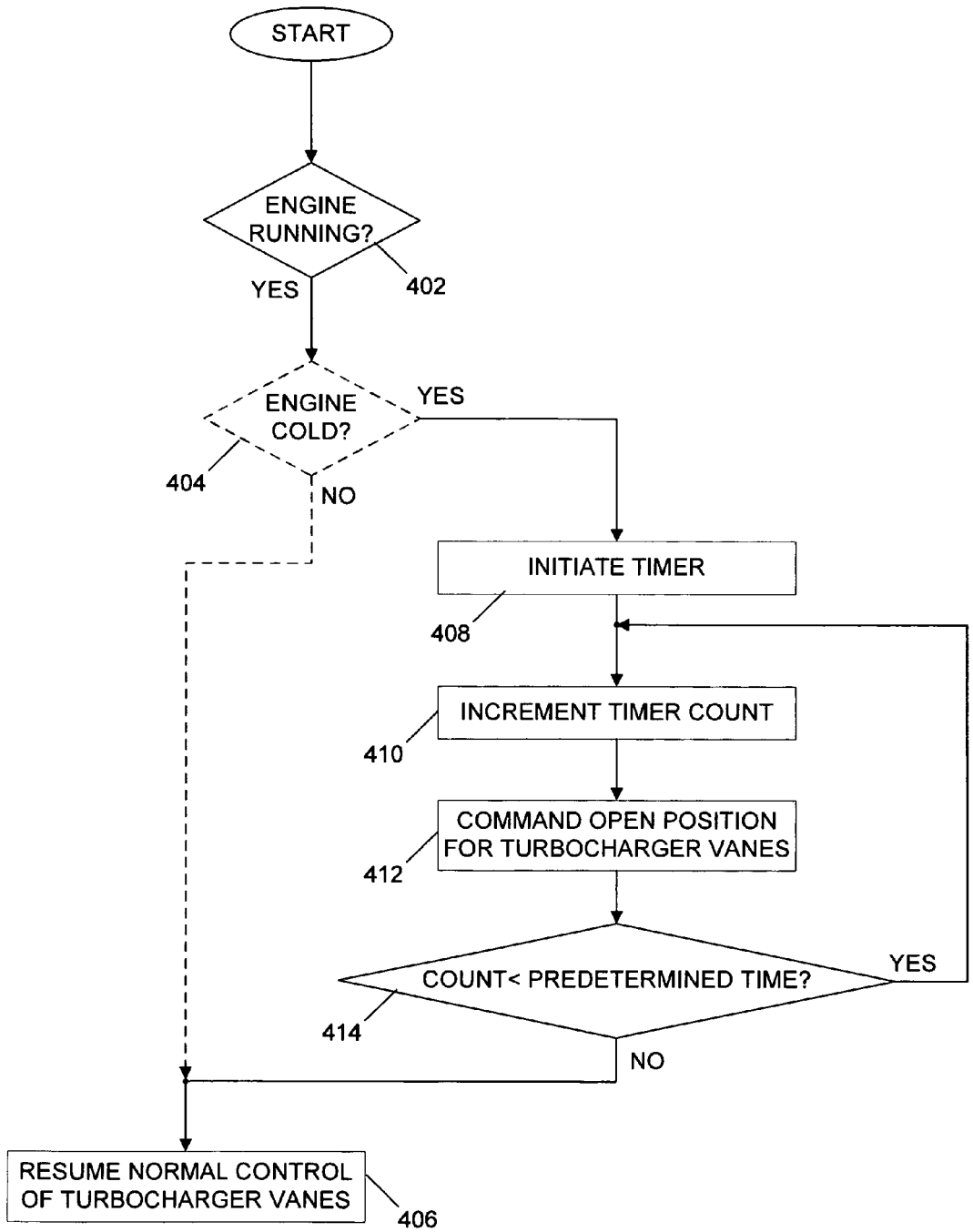
FIG. 4 is a flowchart for a method of controlling a turbocharger for an internal combustion engine in accordance with the invention.

A flowchart for a method of controlling a turbocharger for an internal combustion engine is shown in FIG. 4. A determination on an operational status of the engine may be performed at step 402. When it is determined that the engine is running, an optional determination on a temperature status of the engine may be performed at step 404. At times when it is determined that the engine is not cold, normal operation of the turbocharger may be conducted at step 406. Alternatively, at times when it is determined that the engine is cold, a timer may be initiated at step 408.

The timer that is initiated at step 408 may be of a type typically included in the hardware and/or software of an electronic engine controller. The timer may advantageously be an incremental timer that may begin counting incrementally from an initial time, t0, to a final or predetermined time, t1. The predetermined time t1 may advantageously be a calibrateable value that may be either encoded in the hardware and/or software of the electronic engine controller. A variable, for example a COUNT, may be used internally to the timer of step 408 to increment from the time to t0 the time t1. After the timer has been initiated at step 408, the COUNT variable may be incremented at step 410 using, for example, a simple programming algorithm, such as COUNT=COUNT+1, or any other suitable algorithm.

A command to substantially open the vanes of a variable geometry turbocharger to assume an open position may be implemented at step 412. A determination of the progress of the timer may be performed at step 414. If the COUNT variable is determined to be less than the predetermined time t1, the process may return to the incrementing step 410, thusly repeating or maintaining the command for an open position of step 412. When the COUNT variable ceases to be less than the time limit t1, the process may continue with the previously described step 406 to resume normal control of the turbocharger by the electronic engine controller.

Step 404 is optional in the flowchart of FIG. 4 because engine temperature may be one of many factors that might adversely affect a time required for an adequate amount of lubrication oil to reach the turbocharger. Other factors may include the size and type of plumbing on the engine used to circulate lubrication oil, the size of an oil pump used by the engine, the idle speed of the engine, and so forth.

Furthermore, the time limit t1 may not be a constant value applicable to all conditions of engine operation, and may advantageously be a value that is varied depending on circumstances. For example, the time limit t1 may be decreased for an engine starting up while still warm, increased for an engine starting up cold, decreased or changed while the timer is functioning should a vehicle operator demand power from the engine or the engine is no longer idling or an engine condition changes, and so forth. Advantageously, the time period t1 should be selected based on specific requirements of an engine application. Some engines may require about 10 to 12 seconds before an adequate flow of lubrication oil is made available for a turbocharger, but other engines may have different requirements.

Figure 5:
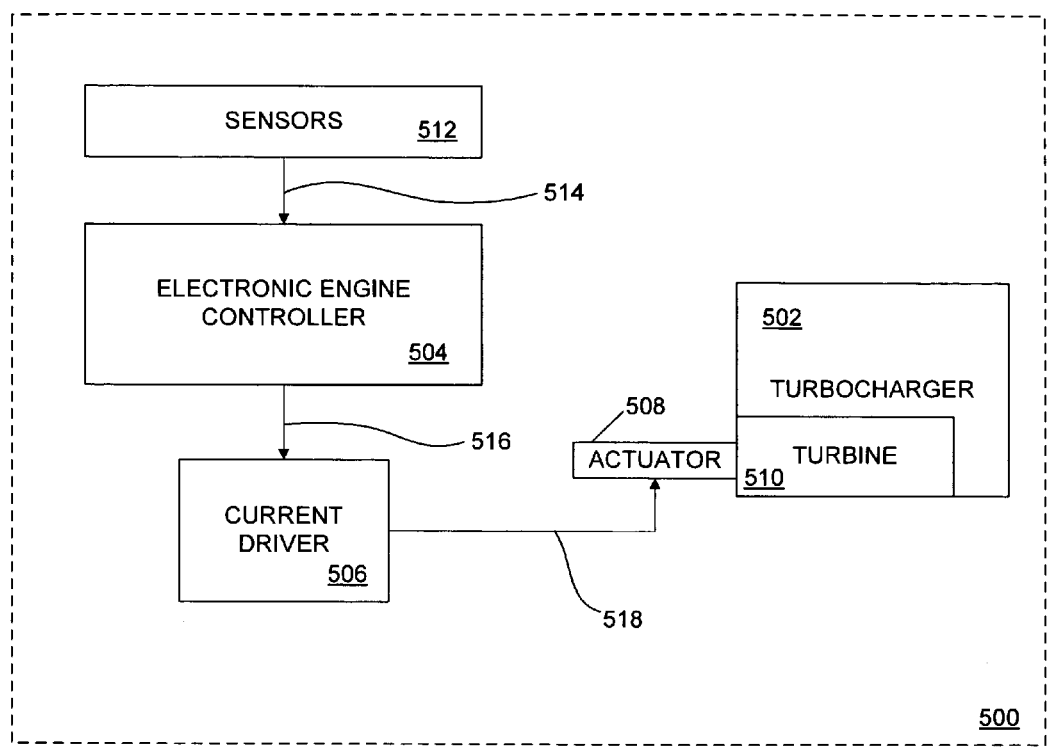
FIG. 5 is a block diagram of an engine having an electronic engine controller that controls a variable geometry turbocharger in accordance with the invention.

A block diagram of an engine 500 having a turbocharger 502 is shown in FIG. 5. The engine 500 may include an electronic engine controller 504 that may be connected to a current driver 506. The current driver may be connected to an actuator 508 that may be part of the turbocharger 502 and be arranged to change a geometry of a turbine 510 that may be included in the turbocharger 502. A plurality of sensors 512 may be located on different locations on the engine 500 and may be connected to and arranged to transfer information and/or signals to the electronic engine controller 504.

During operation of the engine 500, information about operating parameters of the engine 500 may be relayed to the electronic engine controller 504 through a sensor harness 514 connecting the plurality of sensors 512 with the electronic engine controller 504. The electronic engine controller 514 may calculate various engine parameters, and issue commands to the current driver 506 through a communications link 516. The current driver may interpret and convert the commands from the communications link 516 into current signals that may be then relayed to other engine components, including the actuator 508, through an engine harness 518. The electronic engine controller 504 may include functionality coded therein that protects the turbocharger 502 from damage due to inadequate lubrication during and immediately following an engine startup condition.

When the engine 500 is started, the electronic engine controller 504 may receive information from the sensors 512 and compute an inference or whether adequate lubrication may be present at the turbocharger 502. At times when the controller 504 determines that the turbocharger 502 lacks adequate lubrication, a command may be issued to the current driver 506 that may cause the same to send a current signal that will cause the actuator 508 to open the vanes in the turbine 510.

One advantage of the methods described herein is that effective protection of a turbocharger for an engine from damage from operation without adequate lubrication during engine startup may be avoided without use of additional components on the engine, for example, a check valve or an oil injection device capable of temporarily supplying the turbocharger with lubrication during engine startup. Such and other solutions tend to be expensive and complicated in their implementation, while the methods described herein make use of existing control schemes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for controlling a variable geometry turbocharger in an internal combustion engine, comprising the steps of:
   when the engine is operating in a first mode:
      sensing at least one engine parameter;
      inputting the at least one engine parameter to a controller;
      determining a control setpoint based on a desired value of the at least one engine parameter;
      measuring a value;
      determining a difference between the control setpoint and the measured value;
      calculating a duty cycle based upon the difference; and actuating turbocharger vanes based upon the duty cycle;
   when the engine is operating in a second mode:
      actuating the turbocharger vanes thereby causing them to assume, for a predetermined time, a substantially open position that is not based on said desired value;
      wherein the engine operates in the second mode immediately following an engine startup event,
      and wherein the engine operates in the first mode when the predetermined time of the second mode has expired.

2. The method of claim 1, comprising the steps of:
   determining operating temperature of the engine;
   setting a flag to a first value when the operating temperature of the engine is cold;
   setting the flag to a second value when the operating temperature of the engine is warm; and
   using the second value of the flag to define the first mode and the first value of the flag to define the second mode.

3. The method of claim 1, further comprising the steps of:
   in the second mode, initiating a timer upon occurrence of the engine startup event; and
   monitoring a time parameter of the timer, and operating the engine in the first mode when the time parameter reaches a predetermined time.

4. The method of claim 3, wherein the predetermined time may be at least one of a constant value and a variable value, and wherein the variable value is determined by an engine operating condition parameter.

5. The method of claim 3, wherein the predetermined time is adequate for supplying the turbocharger with a flow of lubrication oil.

6. The method of claim 1, further comprising the step of switching a switch based on a flag value, wherein the switch has a first input node that is associated with the first mode, and wherein the switch has a second input node that is associated with the second mode.

7. An internal combustion engine, comprising:

an electronic engine controller (EEC) connected to a current driver and arranged to relay commands thereto, wherein the EEC includes a timer;

a plurality of sensors disposed on the engine, the sensors operably connected to the EEC and arranged to send information thereto;

a turbocharger that includes:

a turbine that is capable of variable geometry adjustments, an actuator that is connected to the turbine and that is arranged and constructed to adjust a geometry of the turbine;

wherein the EEC is capable of determining a starting condition of the engine, wherein the EEC is capable of initiating the timer when the engine is started, wherein the timer is active for a predetermined time, wherein the EEC is capable of commanding a current driver to send an opening current to the actuator while the timer is active, and wherein the geometry of the turbocharger is kept substantially open while the opening current is being sent to the actuator, and wherein the EEC further includes the capabilities of:

determining an activation of an engine ignition system;

determining an operating mode of the engine;

determining an operating temperature condition of the engine;

setting a flag to a first value when the operating temperature condition of the engine is cold; and selling the flag to a second value when the operating temperature condition of the engine is warm.

8. An engine as set forth in claim 7, wherein the predetermined time may be at least one of a constant value and a variable value, and wherein the variable value is determined by an engine operating condition parameter.

9. An engine as set forth in claim 7, wherein the predetermined time is adequate for supplying the turbocharger with a flow of lubrication oil.

* * * * *